(12) United States Patent
Metzger

(10) Patent No.: US 8,534,309 B2
(45) Date of Patent: Sep. 17, 2013

(54) SLIDE VALVE

(75) Inventor: Harry Metzger, Kerava (FI)

(73) Assignee: Maricap Oy, Vantaa (FI)

( * ) Notice: Subject to any disclaimer, the term of this patent is extended or adjusted under 35 U.S.C. 154(b) by 10 days.

(21) Appl. No.: 13/062,963

(22) PCT Filed: Sep. 7, 2009

(86) PCT No.: PCT/FI2009/050716
§ 371 (c)(1),
(2), (4) Date: Mar. 9, 2011

(87) PCT Pub. No.: WO2010/029213
PCT Pub. Date: Mar. 18, 2010

(65) Prior Publication Data
US 2011/0163251 A1 Jul. 7, 2011

(30) Foreign Application Priority Data
Sep. 10, 2008 (FI) .................................... 20085853

(51) Int. Cl.
*F16K 27/04* (2006.01)
(52) U.S. Cl.
USPC .......................... 137/240; 137/340; 251/329
(58) Field of Classification Search
USPC ................... 251/326–329; 137/15.04, 15.05, 137/15.06, 238, 240, 241, 334, 340
See application file for complete search history.

(56) References Cited

U.S. PATENT DOCUMENTS

| | | | |
|---|---|---|---|
| 2,705,016 A * | 3/1955 | Saar | 137/1 |
| 3,334,653 A * | 8/1967 | Anderson et al. | 137/546 |
| 3,921,957 A * | 11/1975 | Freeman | 251/327 |
| 4,535,801 A | 8/1985 | Neale | |
| 4,598,732 A * | 7/1986 | Seeger et al. | 137/334 |
| 4,765,361 A * | 8/1988 | Clifford | 137/315.31 |
| 4,909,272 A * | 3/1990 | Carpentier | 137/240 |
| 6,422,535 B1 * | 7/2002 | Stone et al. | 251/327 |
| 7,059,586 B2 * | 6/2006 | Vanderberg et al. | 251/328 |

FOREIGN PATENT DOCUMENTS
WO    WO 2007/135237 A1    11/2007

* cited by examiner

*Primary Examiner* — John Bastianelli
(74) *Attorney, Agent, or Firm* — Birch, Stewart, Kolasch & Birch, LLP

(57) ABSTRACT

A gate valve, comprising a body (1), a gate element (2), which is movable in the body, transversally with respect to the flow path (3) between at least two positions, i.e. a first position, where the flow path (3) is open, and a second position, where the flow path is closed, and means (4) for moving the gate element (2) between at least said two positions; said gate valve body (1) comprising a first wall element (9) and a second wall element (10) and a space (11) left therebetween for the gate element (2), and an edge part (12), which edge part, when bent, forms a support surface for the first wall element (9) and the second wall element (10) of the gate valve body; in said edge part (12), there is arranged a channel space (13), including at least one opening (14), preferably several openings, which channel space opens into the space (11) left between the first wall element (9) and the second wall element (10) for conducting medium into said space. The edge part (12) is a pipe element, which is arranged between the first wall element (9) and the second wall element (10), and the walls (9, 10) are pressed by clamping means (15, 16) against the edge part (12), so that the edge part is pressed in between the first wall (9) and the second wall (10).

17 Claims, 5 Drawing Sheets

SLIDE VALVE

BACKGROUND OF INVENTION

The invention relates to a gate valve comprising a body, a gate element that is movable in the body, transversally with respect to a flow path between at least two positions, a first position in which the flow path is open, and a second position in which the flow path is closed, as well as means for moving the gate body between at least said two positions; said gate body comprises a first wall element and a second wall element, and a space for the gate element left therebetween, as well as an edge part, which edge part, when bent, forms a support surface for the first wall element and the second wall element of the gate valve body; in said edge part, there is arranged a channel space, including a at least one opening, preferably several openings, which channel part opens into the space left between the first wall element and the second wall element for conducting medium into said space.

From the publication WO2007/135237 A1, there is known a gate valve according to the object of the invention. In known arrangements, the gate valve body is either welded, in which case the edge part is welded to the wall elements, or there is used a special edge profile, including a channel part and a support part, to which side walls there are fastened fastening means. Both of these solutions may bring forth problems with the sealing of the valve body. High requirements are set for the quality of the welding, in order to make the joint leak-proof. A special profile edge part, where the side walls are fastened to the profile support part, may require extra sealing. On the other hand, a special profile is fairly expensive. In addition, dirt may in some embodiments cause problems of hygiene, when dirt has access into the joint between the walls and the edge profile. Various different valve structures have been used in an attempt to solve hygiene-related problems. Generally these have, however, been complicated and thus resulted in arrangements with high expenses.

An object of the present invention is to achieve a totally new arrangement for a gate valve with which the drawbacks of known solutions are avoided. Another object of the invention is to achieve a valve structure, the processability of which is good and which also is easy from the viewpoint of assembly. A further object of the invention is to achieve a sufficiently good arrangement with respect to tight sealing.

BRIEF DESCRIPTION OF INVENTION

A gate valve according to the invention is mainly characterized in that the edge part is a pipe element, which is arranged in between a first wall element and a second wall element, and in that the walls are pressed by clamping means against the edge part, so that the edge part is pressed in between the first wall and the second wall.

The arrangement according to the invention has several significant advantages. A gate valve according to the invention has excellent processability. By using a laminar-structured valve body and gate element, it has been possible to achieve an easily modifiable structure for various different targets of usage. When the employed edge part is a pipe element, which advantageously also serves as an elastic element and is pressed by clamping means in between the first and second wall element, there is realized an extremely advantageous solution for a gate valve body. By providing cleaning means in connection with the valve, it is possible to prevent the material to be conveyed along the flow path from being accumulated in the space left in between the body walls, and at the same time to prevent possible disturbances in the operation, caused by accumulated dirt.

BRIEF DESCRIPTION OF DRAWINGS

The invention is explained in more detail below, by means of an example and with reference to the appended drawings, where.

DETAILED DESCRIPTION OF INVENTION

Figure 1:
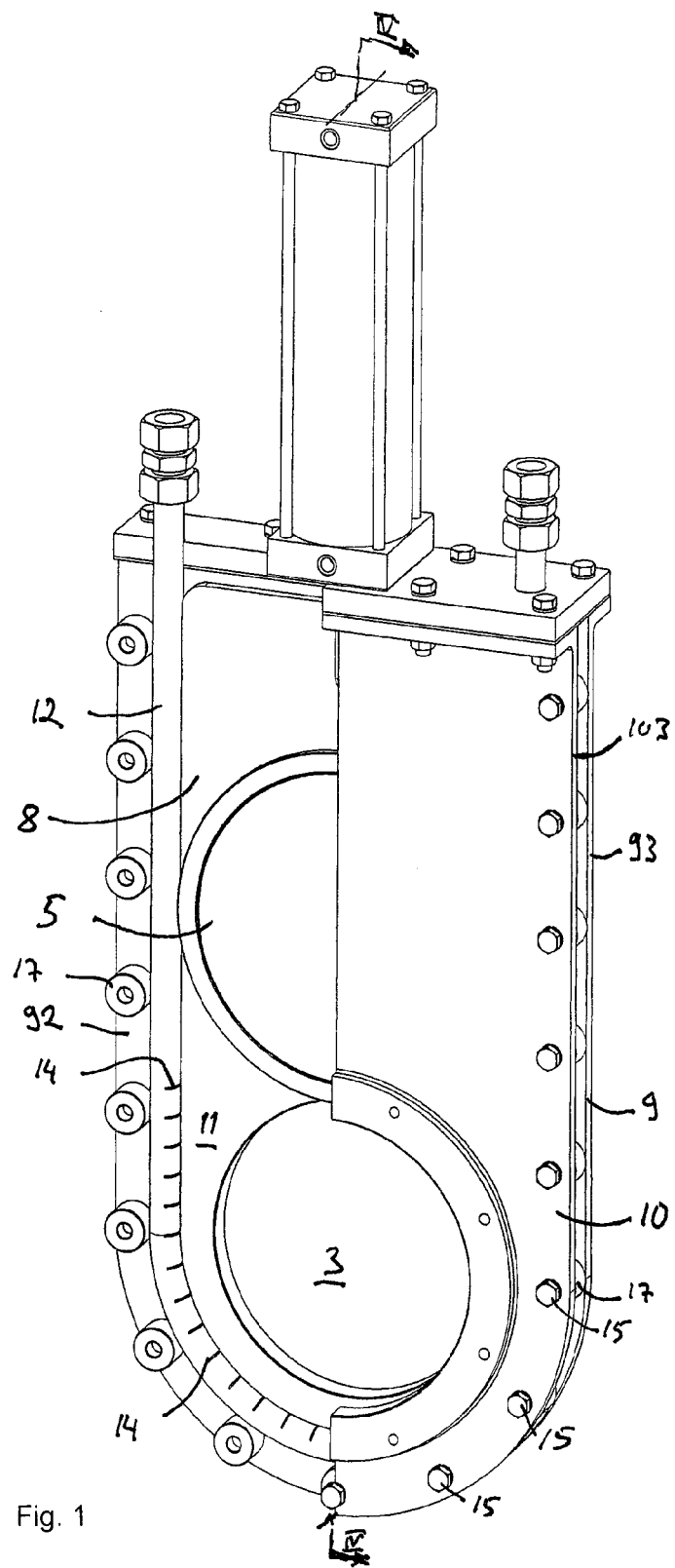
FIG. 1 shows a gate valve according to the invention, the other front wall partly in cross-section, with the flow path in the open position.
Figure 2:
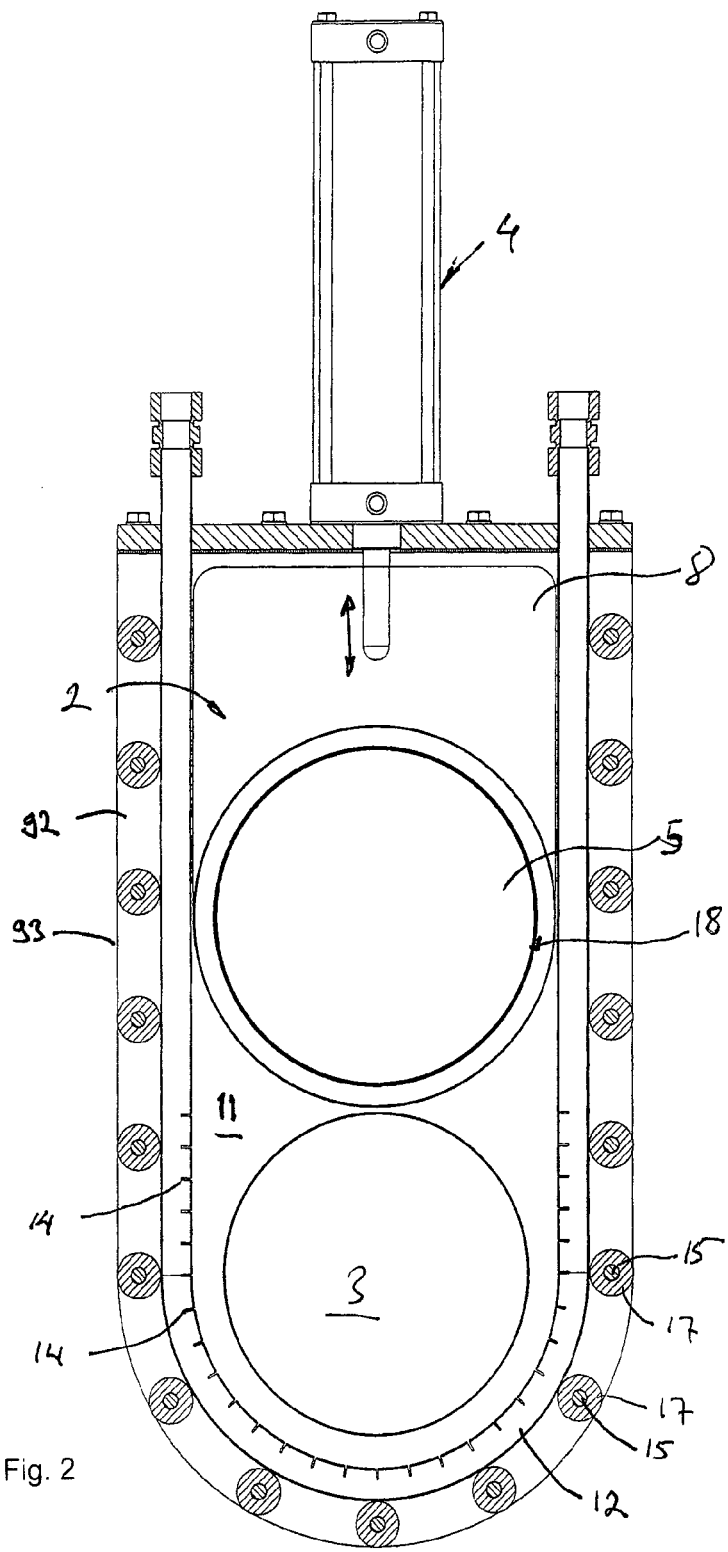
FIG. 2 shows a gate valve according to the invention in cross-section, with the flow path in the open position.
Figure 3:
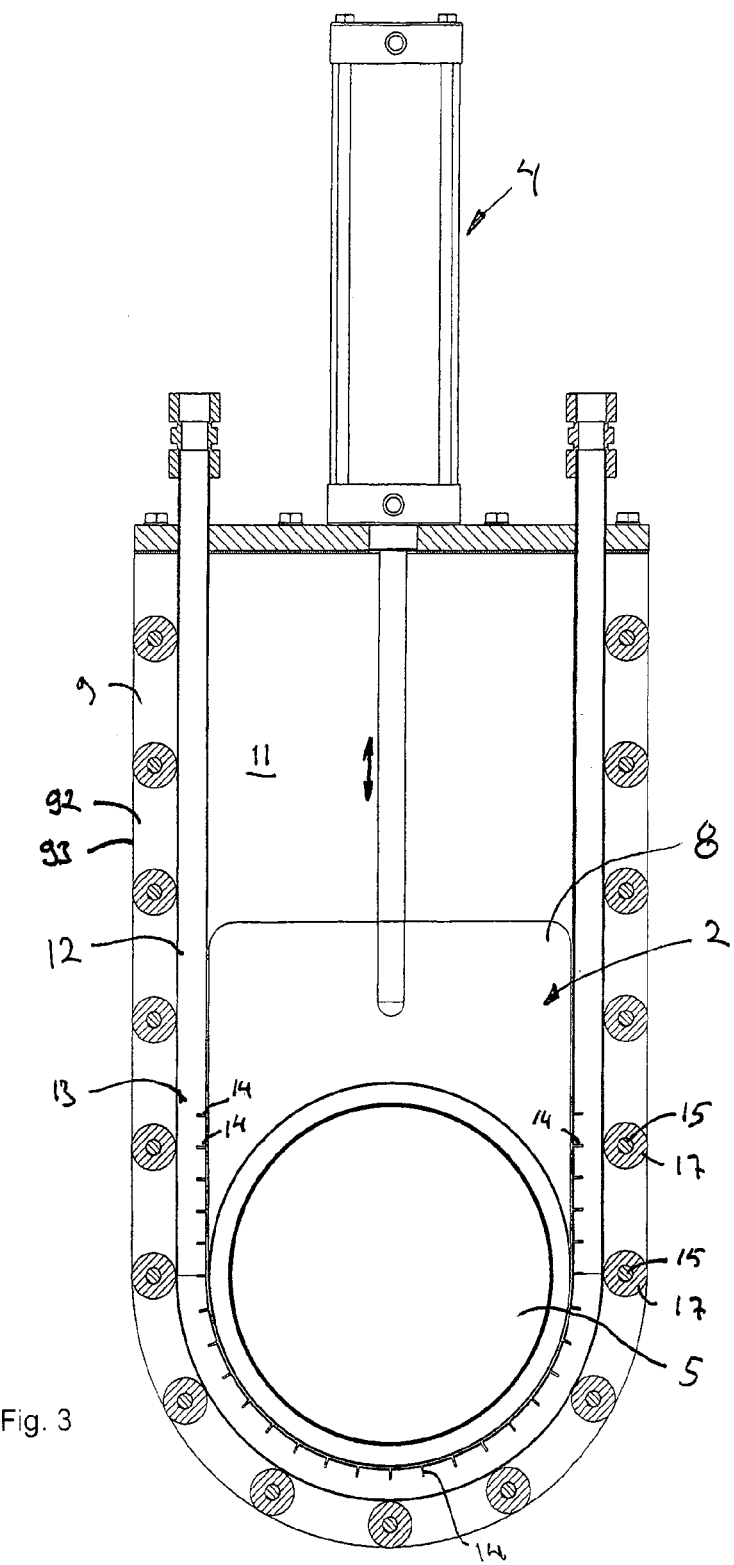
FIG. 3 shows a gate valve according to the invention in cross-section, with the flow path in the closed position.
Figures 4, 5:
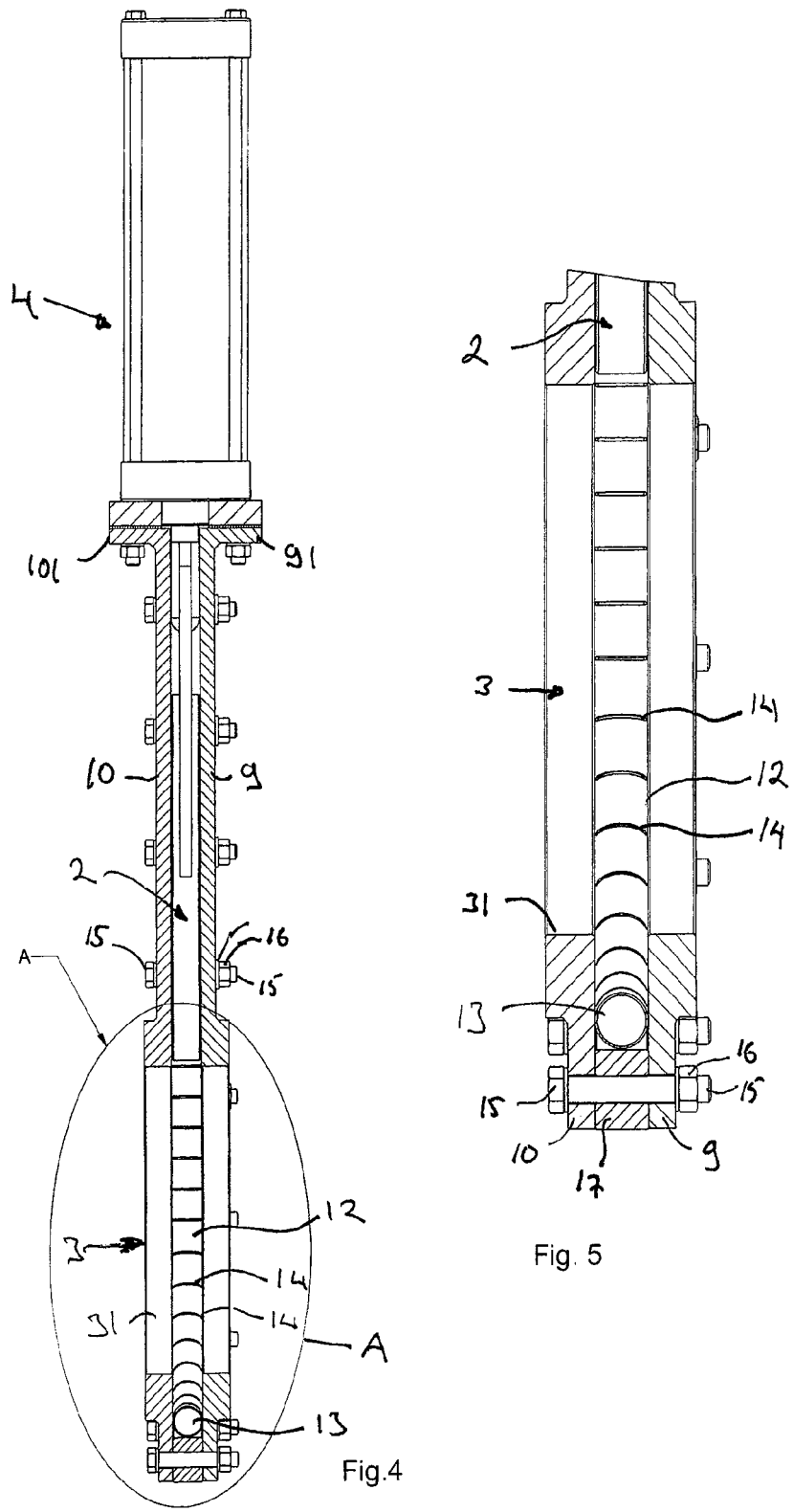
FIG. 4 shows a gate valve according to the invention in a cross-section along line IV-IV of FIG. 1.
FIG. 5 shows a detail A of FIG. 4 enlarged.

FIG. 1 illustrates a gate valve according to the invention, seen in a perspective view, in a partial cross-section. In the drawing, half of the wall 10 is cut, so that the interior of the valve is partly visible in the drawing. FIGS. 1-7 illustrate an embodiment of the valve according to the invention, particularly a gate valve, comprising a body 1, a gate element 2, which is movable in the body, transversally with respect to the flow path 3, between at least two positions, i.e. a first position, where the flow path 3 is open, and a second position, where the flow path is closed. Typically the valve also comprises means 4 for moving the gate element 2 between at least said two positions. The gate element 2 comprises at least one gate part 5. In the drawings, the flow path 3 proceeds through the valve body 1. In the embodiment of the drawing, the gate element 2 is arranged to move, driven by an actuator 4, between a top position, where the flow path is open, and a bottom position, where the flow path is closed. The gate element 2 is arranged to move in the space 11 left between the body walls 9, 10. The mutually facing surfaces of the walls 9, 10 typically function as guide surfaces of the gate element. In the flow channel wall, there is formed a gap, through which the gate element moves and closes the flow channel. The gate part 5 of the gate element 2 extends to outside the edges of the flow aperture of the flow channel 3. Typically in connection with a regular, circular flow aperture of the cross-section of the flow path, the diameter of the gate part 5 is thus larger than the diameter of the flow aperture of the flow path 3 at the intersection of the gate element 2 and the flow path 3.

The gate element 2 comprises an actuating body 8, along with which the gate part 5 is arranged to be moved. In the embodiment of FIGS. 1-5, the actuating body is a laminar element, in which there is formed a space 18 for the gate part 5. In the embodiment of the drawings, the space 18 is an opening formed in the actuating body, in which the gate part can be fitted. Now the edges of the opening 18 serve as the support surfaces of the gate part 5 when the gate part is being moved.

According to a preferred embodiment, the gate part 5 is a laminar part. In the embodiments of FIGS. 1-7, the gate parts are circular plate parts. Naturally, any other shape is possible in accordance with the target of application in question.

In the embodiment of the drawings, the valve body 1 comprises a first wall element 9 and a second wall element 10, and a space 11 left therebetween for the gate element 2. In the embodiment of the drawing, the gate element is moved in the space 11 by an actuator 4, which is a cylinder-and-piston combination. In the embodiment of the drawings, the actuator is fastened by fastening means to shoulders made in the body. The piston rod operates as a valve stem, which is connected to the gate element 2. In the drawing, the element comprises an actuating body 8.

The gate part 5 is arranged in the space 18 formed in the actuating body 8, to be freely movable along with the actuating body 8 in between the guide surfaces of the body element.

According to an embodiment, the actuating body 8 is a laminar element, in which there is formed an opening 18, where the gate part 5 is arranged to fit in. The opening 18 is formed for example by die cutting or cutting, such as laser cutting. Thus there is achieved a solution that fulfils sufficiently precise measure tolerances. Respectively, the body wall elements 9, 10 can be made of laminar material and produced for instance by laser cutting.

According to a preferred embodiment, the valve can further comprise means 14, 26, 27, 28 for cleaning at least part of the space 11 left between the walls 9, 10 of the body part.

Typically, the valve can comprise means 14, 26, 27, 28 for cleaning at least part of the space 11 left between the walls 9, 10 of the body part by spraying medium.

Figures 6, 7:
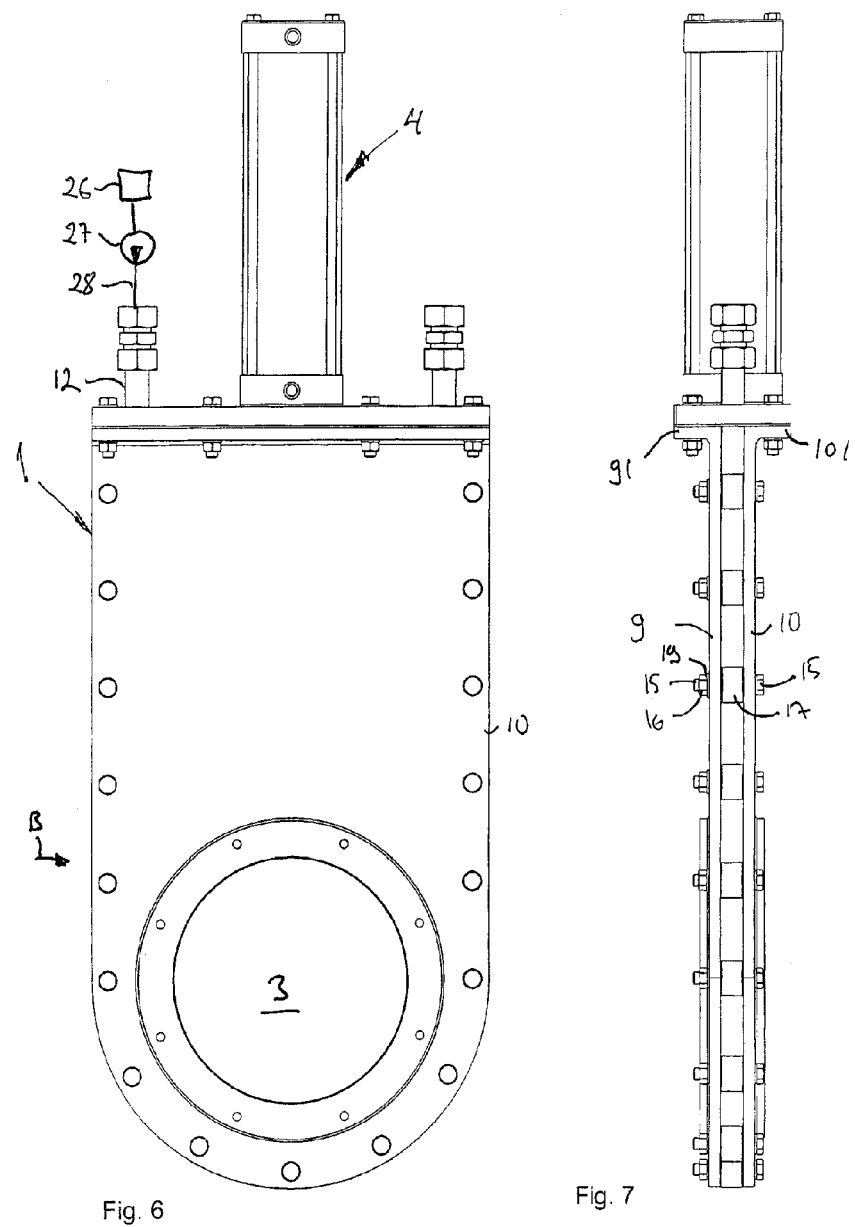
FIG. 6 shows a valve according to the invention.
FIG. 7 shows a valve according to the invention, viewed from the direction B of FIG. 6.

According to FIG. 6, medium can be conveyed from a medium source 26 by a pump device 27 along a channel 28 into the channel 13 of a pipe 12, and from there, via openings 14 into the space 11. The openings 14 are typically arranged in the vicinity of the channel 3 in FIG. 5, especially in the area of the space 11 where the gate element 2 must extend in the closed position. Naturally the wall parts are provided with a flow aperture 3. In the wall parts, there is naturally provided a flow opening 3. Between the wall parts, there is left a space 11 for the gate element 2. The laminar-structured valve according to the embodiment is considerably advantageous and easy to manufacture especially in smallish production runs, for example for casting-structured valve arrangements.

The walls 9, 10 are fastened by clamping means 15, 16 to each other, so that the edge part remains in between the walls. In the first wall 9 and the second wall 10, at mutually matching points, there are arranged openings, through which the screw part of the screw element 15 serving as the clamping element extends, and on the opposite side, the walls 9, 10 are tightened by means of a counterpart, such as a nut element 16, so that the edge part 12 in left between the walls is somewhat compressed. In between the walls, there is provided a stopper element 17, the thickness of which is somewhat smaller than the diameter of the edge part 12. In thickness, the stopper element 17 is advantageously somewhat larger than the gate element.

According to a preferred embodiment, the edge part 12 is a pipe, having a diameter of for example 50 mm and a wall thickness of 2 mm; it is secured by clamping means 15, 16 in between the first and second wall elements 9, 10 of the gate valve. In between the wall elements 9, 10 there are provided stopper elements 17, typically sleeves, which are designed to be shorter than the outside diameter of the pipe, so that the pipe is secured tightly in place. The pipe serves as a conveyor of blasting air and as a side wall of the valve.

Prior to bending, it is easy to provide the pipe serving as the edge part 12 by gaps 14 or holes, through which there is blasted medium, such as blasting air, into the space 11.

In the description below, there are explained a few preferred embodiments of the gate valve according to the invention.

Thus, the invention relates to a gate valve, comprising a body 1, a gate element 2, which is movable in the body, transversally with respect to the flow path 3, between at least two positions, i.e. a first position, where the flow path 3 is open, and a second position, where flow path is closed, as well as means 4 for moving the gate element 2 between at least said two positions, said gate valve body 1 comprising a first wall element 9 and a second wall element 10, and a space 11 left therebetween for the gate element 2, as well as an edge part 12, which edge part, when bent, forms a support surface for the first wall element 9 and the second wall element 10 of the gate valve body; in said edge part 12, there is arranged a channel space 13, including at least one opening 14, preferably several openings, which channel part opens into the space 11 left between the first wall element 9 and the second wall element 10 for conducting medium into said space. The edge part 12 is a pipe element, which is arranged between the first wall element 9 and the second wall element 10, and the walls 9, 10 are pressed by clamping means 15, 16 against the edge part 12, so that the edge part is pressed in between the first wall 9 and the second wall 10.

Typically the gate valve also comprises at least one stopper element 17 in between the first wall element 9 and the second wall element 10.

At least one stopper element 17 is arranged in between the first wall element 9 and the second wall element 10, so that the stopper element, when tightened, restricts the distance left between the walls.

When tightened, the perpendicular distance between the first and second wall element 9, 10 is somewhat shorter than the diameter of the tubular edge part 12, or the perpendicular distance between the external wall portions facing its first and second wall elements prior to pressing the edge part between the wall elements 9, 10.

The clamping means 15, 16 are arranged in the edge area 92 of the first and second wall elements 9, 10, which is the wall area located from the edge part 12 towards the outer edge 93, 103 of the laminar parts 9, 10.

In the first and second walls of the body, there are formed openings for the clamping means 15, 16 in the edge area 92 of the first and second wall elements 9, 10.

The stopper element 17 is typically a sleeve element.

The clamping element 15, 16 is a bolt-and-nut combination.

The gate element 2 comprises an actuating body 8, along with which at least one gate part 5 is arranged to be moved.

The gate part 5 is a laminar element. Typically at least one gate part 5 is arranged in the space 18 formed in the actuating body 8, to be freely movable along with the actuating body 8, in between the guide surfaces of the body element.

In addition, the valve comprises means 14, 26, 27, 28 for cleaning at least part of the space 11 left between the body element walls 9, 10.

The edge part 12 is an elastic element between the first wall element 9 and the second wall element 10.

The opening 14 provided in the wall of the edge part 12 is a gap, preferably a gap that is oriented transversally with respect to the direction of the edge part channel 13.

The embodiment of the gate valve according to the drawings is an extremely advantageous alternative for a welded structure. Now it is possible to avoid welding, among others, which means that the assembly of the valve is extremely easy.

For a man skilled in the art, it is obvious that the invention is not restricted to the above described embodiments only, but many modifications are possible within the scope of the appended claims. Such characterizing features that in the specification are possibly described together with other characterizing features can, when necessary, also be used separately.

The invention claimed is:

1. A gate valve which is adapted to traverse a flow path between an open and a closed position which comprises:
    a gate valve body having a first wall element and a second wall element, said first wall element and said second wall element defining a space therebetween, said first and second wall elements containing an edge part which provides a support surface for the first and second wall elements of the gate valve body,
    at least one stopper element disposed between the first wall element and the second wall element,
    a gate element movable within said gate valve body between the open and closed position,
    wherein the edge part defines a channel space containing at least one aperture which communicates with the space between the first and second wall elements and means for conducting a medium into said channel space, and
    wherein the first and second wall elements are compressed against the edge part by clamping means so that the edge part is pressed in between the first and second wall elements.

2. The gate valve according to claim 1, wherein when the first and second wall elements are compressed by the clamping means, the stopper element is also compressed, thereby restricting the distance between the first and second wall elements.

3. The gate valve according to claim 2, wherein the distance between the first and second wall elements is less than the diameter of the tubular edge part, or the distance between the external wall portions facing the first and second wall elements, prior to pressing the edge part between the first and second wall elements.

4. The gate valve according to claim 2, wherein the clamping means are arranged in an edge area of the first and second wall elements.

5. The gate valve according to claim 1, wherein the edge part has a tubular configuration and wherein the distance between the first and second wall elements is less than the diameter of the tubular edge part, or the distance between the external wall portions facing the first and second wall elements, prior to pressing the edge part between the first and second wall elements.

6. The gate valve according to claim 5, wherein the clamping means are arranged in an edge area of the first and second wall elements.

7. The gate valve according to claim 1, wherein the clamping means are arranged in an edge area of the first and second wall elements.

8. The gate valve according to claim 1, wherein in the edge areas of the first and second wall elements, there are formed openings to accommodate the clamping means.

9. The gate valve according to claim 1, wherein the stopper element is a sleeve element.

10. The gate valve according to claim 1, wherein the clamping means is a bolt-and-nut combination.

11. The gate valve according to claim 1, wherein an actuating body is operatively connected to the gate element for moving the gate element between an open and closed position.

12. The gate valve according to claim 11, wherein the gate element is freely movable by the actuating body between guide surfaces of the gate valve body.

13. The gate valve according to claim 1, wherein the gate element is a laminar element.

14. The gate valve according to claim 1, wherein the edge part is an elastic element disposed between the first wall element and the second wall element.

15. The gate valve according to claim 1, wherein the apertures in the edge part is a gap that is oriented transversally with respect to the direction of the edge part channel.

16. The gate valve according to claim 1, wherein the distance between the first and second wall elements is less than the diameter of the tubular edge part, or the distance between the external wall portions facing the first and second wall elements, prior to pressing the edge part between the first and second wall elements.

17. The gate valve according to claim 1, wherein the clamping means are arranged in an edge area of the first and second wall elements.

* * * * *